(12) United States Patent
Kojima

(10) Patent No.: US 7,565,057 B2
(45) Date of Patent: Jul. 21, 2009

(54) INFORMATION PROCESSING APPARATUS AND INFORMATION PROCESSING METHOD

(75) Inventor: Toshiaki Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 849 days.

(21) Appl. No.: 10/474,922

(22) PCT Filed: Apr. 17, 2002

(86) PCT No.: PCT/JP02/03830

§ 371 (c)(1),
(2), (4) Date: Oct. 16, 2003

(87) PCT Pub. No.: WO02/086895

PCT Pub. Date: Oct. 31, 2002

(65) Prior Publication Data

US 2004/0126084 A1 Jul. 1, 2004

(30) Foreign Application Priority Data

Apr. 20, 2001 (JP) .............................. 2001-123539

(51) Int. Cl.
*H04N 5/91* (2006.01)
*H04N 7/00* (2006.01)

(52) U.S. Cl. ........................ 386/46; 360/72.1; 360/72.2; 360/72.3; 242/324

(58) Field of Classification Search .................... 386/46; 360/72.3, 73.09, 74.2, 74.3, 72.1, 72.2; 242/324
See application file for complete search history.

(56) References Cited

U.S. PATENT DOCUMENTS

| | | | | |
|---|---|---|---|---|
| 4,206,483 A | * | 6/1980 | Nakamura | 386/77 |
| 4,723,181 A | | 2/1988 | Hickok | |
| 5,540,398 A | * | 7/1996 | Nishida et al. | 242/334.2 |
| 5,636,078 A | * | 6/1997 | Tsai | 360/72.1 |
| 5,805,371 A | * | 9/1998 | Uejima et al. | 360/72.3 |
| 5,808,824 A | * | 9/1998 | Kaniwa et al. | 360/71 |
| 5,852,534 A | | 12/1998 | Ozue et al. | |
| 6,657,667 B1 | * | 12/2003 | Anderson | 348/333.12 |

FOREIGN PATENT DOCUMENTS

| | | |
|---|---|---|
| EP | 0 903 940 | 3/1999 |
| EP | 0 997 908 | 5/2000 |
| JP | 63 113881 | 5/1988 |
| JP | 4 339387 | 11/1992 |
| JP | 8 63831 | 3/1996 |
| JP | 9-8714 | 1/1997 |
| JP | 10-177780 | 6/1998 |

(Continued)

*Primary Examiner*—Tung Vo
*Assistant Examiner*—Anner Holder
(74) *Attorney, Agent, or Firm*—Frommer Lawrence & Haug LLP; William S. Frommer; Thomas F. Presson

(57) ABSTRACT

A recording unit for recording image information and/or audio information onto a replaceable tape-shaped recording medium, filing units for filing the image information and/or the audio information which have been written onto the replaceable tape-shaped recording medium by the recording unit, and a file information writing/reading unit for writing/reading, in a non-contact state, file information of file into a random accessible memory unit provided in a manner associated with the replaceable tape-shaped recording medium are provided to thereby realize an information processing apparatus.

15 Claims, 12 Drawing Sheets

FOREIGN PATENT DOCUMENTS

| | | |
|---|---|---|
| JP | 10 188531 | 7/1998 |
| JP | 11 249819 | 9/1999 |
| JP | 2000 235774 | 8/2000 |
| JP | 2002 50093 | 2/2002 |
| JP | 2002 319276 | 10/2002 |
| JP | 2002 320184 | 10/2002 |
| WO | WO 97 02566 | 1/1997 |
| WO | WO 97 47133 | 12/1997 |
| WO | WO 00 38188 | 6/2000 |

\* cited by examiner

| SYMBOL | TYPE/UNIT | DESCRIPTION |
|---|---|---|
| SRSFG | LONG | S REEL FG UP/DOWN COUNTER<br>UP COUNT IN FWD DIRECTION<br>INITIAL VALUE OF TOTAL VOLUME CALCULATION IS ZERO |
| SRTFG | LONG | T REEL FG UP/DOWN COUNTER<br>UP COUNT IN FWD DIRECTION<br>INITIAL VALUE OF TOTAL VOLUME CALCULATION IS ZERO |
| SRCFG | LONG | CAPSTAN FG UP/DOWN COUNTER<br>UP COUNT IN FWD DIRECTION<br>INITIAL VALUE OF TOTAL VOLUME CALCULATION IS ZERO |
| Rso | mm/1000 | S REEL RADIUS DETERMINED FROM SRSFG AND SRCFG |
| Rto | mm/1000 | T REEL RADIUS DETERMINED FROM SRSFG AND SRCFG |
| Rc | mm/1000 | CAPSTAN RADIUS |
| Rs | mm/1000 | S REEL RADIUS |
| Rt | mm/1000 | T REEL RADIUS |
| Ratio | 1/1000 | \|SRTFG\|/\|SRSFG\| |
| SRCFG1 | LONG | VALUE 1 OF SRCFG NECESSARY FOR CALCULATION OF TOTAL VOLUME |
| SRCFG2 | LONG | VALUE 2 OF SRCFG NECESSARY FOR CALCULATION OF TOTAL VOLUME |
| SRCFG3 | LONG | VALUE 3 OF SRCFG NECESSARY FOR CALCULATION OF TOTAL VOLUME |
| Swind1 | 1/1000 | TOLERANCE CHANGE-OF-RATE (1) IN COMPARISON WITH PREVIOUS VOLUME |
| Swind2 | 1/1000 | TOLERANCE CHANGE-OF-RATE (2) IN COMPARISON WITH PREVIOUS VOLUME |
| Swind3 | 1/1000 | TOLERANCE CHANGE-OF-RATE IN COMPARISON WITH PREVIOUS Ratio VOLUME |
| RSTFG | LONG | CHANGE QUANTITIES OF SRSFG, SRTFG NECESSARY FOR CALCULATION OF RADIUS |

FIG.11

INFORMATION PROCESSING APPARATUS AND INFORMATION PROCESSING METHOD

TECHNICAL FIELD

The present invention relates to an information processing apparatus and an information processing method which perform, as file, management of image information and/or audio information recorded on a tape-shaped recording medium.

BACKGROUND ART

Realization of network for conducting transmission/reception between computers which handle various digital data is advancing.

Meanwhile, a large number of VTRs (Video Tape Recorders), which load a video cassette provided with a tape-shaped magnetic recording medium (hereinafter referred to as a magnetic tape as occasion may demand) to record image information and/or audio information onto the tape-shaped magnetic recording medium, and/or reproduce image information and/or audio information which have been recorded, are used in various fields because long time recording can be realized by using the tape-shaped magnetic recording medium, and the video cassette is removal medium and can be carried with ease.

Accordingly, transfer of image information and/or audio information to and from external unit is realized by making use of the above-described network so that VTRs can freely conduct transmission/reception of information within the magnetic tape. From this fact, their use purposes are greatly improved. For this reason, there has been a great demand for realization of network of VTR.

In response thereto, there is devised a technique of conducting transmission/reception of image information and/or audio information from VTR to external unit on the network, e.g., computer by using widely used protocol such as FTP (File Transfer Protocol), etc.

Since it is necessary for the purpose of transferring data to external unit on the network to constitute, as file, data to be transferred to conduct file management by file system, file system has been introduced into VTRs in which concept of file did not exist in the prior art because research of image information or audio information could be sufficiently made by visual sense or auditory sense of user.

In general, in the file system, data recorded on recording medium is constituted as file to collectively perform management of processing relating to file operation such as read processing, write processing, delete processing and/or updating processing for file on the basis of information such as file name, file size, file preparation date and file updating date, etc.

Moreover, in the file system in which management of files recorded on recording medium is conducted on the file basis as described above, management is ordinarily performed in the state where data recording area of the recording medium is divided into a record entry (RE) area where files are recorded and a Free Space List (FSL) area where no file is recorded.

In the file system, in the case where new file is prepared, whether or not space (empty) area exists in the Free Space List (FSL) area is first retrieved. In the file system, in the case where space (empty) area exists in the Free Space List (FSL) area, there is conducted such a processing as to register that area into the Record Entry (RE) area to prepare a new file, and to delete file from the Free Space List (FSL) area.

However, in the file system of information processing apparatus using tape medium as recording medium like VTR, since system data necessary for file management is written at the leading position of the tape medium, there is required an operation to necessarily rewind tape medium up to the leading position to read system data into memory, at the time of starting of the information processing apparatus, or immediately after removal medium is loaded into: the information processing apparatus in the case where tape medium is removal medium. For this reason, there is a problem that such operation is very troublesome.

Further, in the case, e.g., where the content of file is rewritten, there is required an operation to rewind the tape medium until the leading position to update system data, or to temporarily store system data to be updated into a non-volatile memory, etc. in the case where the tape medium is removal medium to rewind the tape at the time of taking out of the tape medium to write the data at a predetermined position. For this reason, there is a problem that such operation is very troublesome.

Further, since VTR can sequentially provide access to the magnetic tape in accordance with command input by user, in the case where file system as described above is provided, there is a possibility that read processing and/or write processing of data may be performed by sequential access, i.e., through path except for the file system so that data is newly written into the data area of the file recorded on the magnetic tape. As a result, there is a problem that the file data would be broken.

Furthermore, the data constituting a file of which the file system performs management have correlation to each other, and are not independent in ordinary state. Such data do not become significant independent data until they are caused to be unit of file. However, since image file consisting of image data has the configuration in which plural GOPs (Group of Pictures) which are information completed by themselves are collected, significant independent data would exist within the file even if data is not caused to be of file unit.

For example, in the case where image data are handled in broadcasting services, etc., image file in which data serving as material have been recorded for a long time period is first generated. Then, only images necessary for broadcasting are extracted from the material to further add other image data to the extracted image data to thereby prepare image file for broadcasting. That is, independent arbitrary image data is extracted from a predetermined image file, etc. thus to prepare new image file.

Meanwhile, in the case where a desired information is retrieved from information recorded on a magnetic tape, e.g., video information or audio information, Time Code (TC) information indicating recording time of the information recorded at a predetermined track provided in the longitudinal direction on the magnetic tape at the time of recording the information or Control signal (CTL) used for tape drive servo control is used.

For example, at VTRs, when user retrieves desired information from information recorded on the magnetic tape provided within a video cassette, the magnetic tape was caused to be run up to the position where the information has been recorded by making use of Time Code (TC) recorded along with the information to conduct retrieval.

However, Time Code (TC) to be recorded onto the magnetic tape is not information indicating absolute position, on the magnetic tape, of video information and/or audio information which have been recorded on the magnetic tape, but is information indicating relative position with recording start point of video information or audio information being as a reference such that starting point of Time Code (TC) can be changed by user.

Accordingly, since it frequently takes place that the same Time Codes (TCs) exist on the magnetic tape, there was a problem that it is very difficult to retrieve information that user desires from information which have been recorded on the magnetic tape by using only Time code (TC) information.

For this reason, user has ensured retrieval of a desired information based on Time Code (TC) information as described above by actually reproducing the magnetic tape to confirm the information retrieval by visual sense or auditory sense. However, information retrieval dependent upon visual sense or auditory sense of user is reliable, but results in the problem that such retrieval is so troublesome that it takes much time.

DISCLOSURE OF THE INVENTION

An object of the present invention is to provide an information processing apparatus which facilitates access to a file system for conducting management of files recorded on a tape-shaped recording medium, an information processing apparatus which performs management of files to be recorded onto a tape-shaped recording medium by using file system, and which can record information onto the tape-shaped recording medium without using the file system, an information processing apparatus capable of freely preparing file irrespective of the file system in the case where data consisting of independent data, e.g., GOP, etc. like image information are recorded on a tape-shaped recording medium, and an information processing apparatus which can securely provide access to information which have been recorded on a tape-shaped recording medium without relying upon visual sense or auditory sense of user.

An information processing apparatus according to the present invention comprises: recording means for recording image information and/or audio information onto a replaceable tape-shaped recording medium; filing means for filing the image information and/or the audio information which have been written on the replaceable tape-shaped recording medium by the recording means; and file information writing/reading means for writing and reading, in a non-contact state, file information of the file into random accessible memory means provided in a manner associated with the replaceable tape-shaped recording medium.

This information processing apparatus can easily acquire file information of files recorded on the tape-shaped recording medium from the random accessible memory means by the file information writing/reading means.

An information processing method according to the present invention includes: recording image information and/or audio information onto a replaceable tape-shaped recording medium; filing the image information and/or the audio information which have been written on the replaceable tape-shaped recording medium; writing, in a non-contact state, file information of the file into random accessible memory means provided in a manner associated with the replaceable tape-shaped recording medium; and reading, in a non-contact state, file information of the file which has been written into the memory means.

This information processing method can easily acquire, from the random accessible memory means, file information of files which have been recorded on the tape-shaped recording medium.

BRIEF DESCRIPTION OF THE DRAWINGS

FIG. 11 is a view showing constants and variables used in calculating winding radius information in the VTR.

BEST MODE FOR CARRYING OUT THE INVENTION

Embodiments of an information processing apparatus and an information processing method according to the present invention will now be described in detail with reference to the attached drawings.

Figure 1:
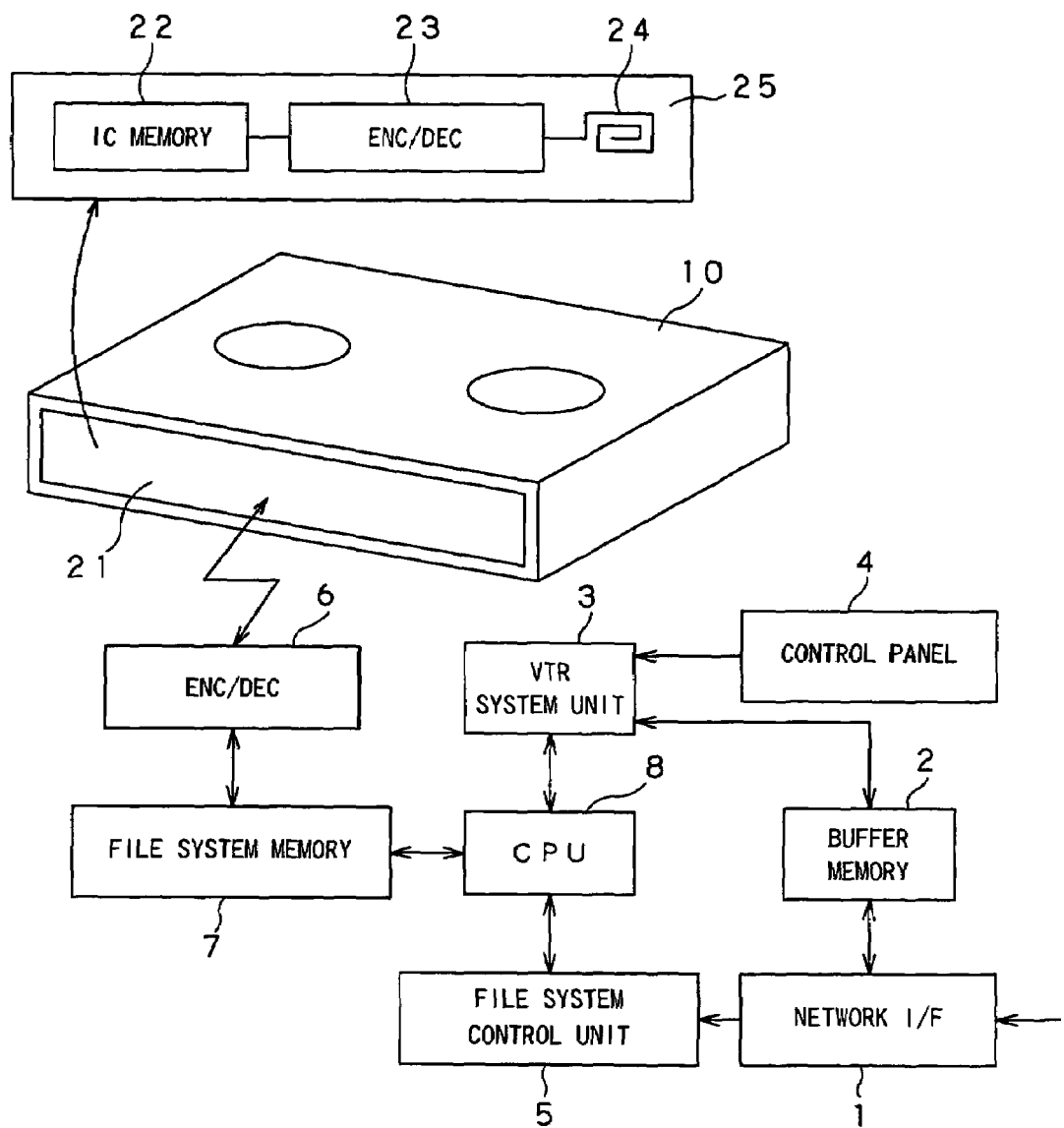
FIG. 1 is a block diagram for explaining the essential part configuration of VTR shown as an embodiment of the present invention.

The present invention is applied to a Video Tape Recorder. (hereinafter referred to as VTR) shown as a block diagram in FIG. 1. The VTR shown as an embodiment of the present invention is an apparatus adapted for loading a video cassette provided with a tape-shaped magnetic recording medium (hereinafter referred to as magnetic tape) into a video cassette loading unit (not shown), and capable of conducting recording of video (image) signals and/or audio signals onto the magnetic tape, or reproducing the signals from the magnetic tape thereof by file management based on the file system, or conducting such operation without intervention of the file system. A video signal to be recorded onto the magnetic tape is inputted from external unit (not shown) through a predetermined network, and a video signal reproduced from the magnetic tape is outputted to external unit (not shown) through a predetermined network.

The VTR comprises a network interface (referred to as network I/F as occasion may demand) 1, a buffer memory 2, a VTR system unit 3, a control panel 4, a file system control unit 5, an encoder/decoder (hereinafter referred to as ENC/DEC) 6, a memory 7 for file system, and a CPU 8.

The network interface 1 is an interface for connecting the VTR and external unit through network. Video signals and/or audio signals are inputted from external unit to the VTR through the network interface 1.

The network to which the VTR is connected through the network interface 1 is, for example, LAN (Local Area Network), etc., wherein Ethernet (Registered Trademark) is used as protocol which covers a portion of data link layer of OSI (Open Systems Interconnection) reference model and physical layer, TCP (Transmission Control Protocol)/IP (Internet Protocol) is used as protocol which covers network layer and transport layer, and FTP (File Transfer Protocol) is used as protocol which covers session layer, presentation layer and application layer, thereby making it possible to transmit and/or receive video information and/or audio information.

The network interface 1 is, for example., NIC (Network Interface Card) which is a dedicated board for network connection, and is provided with a connector to which LAN cable for high speed data transmission in which data transfer rate is 10 M bps, 100 Mbps and, further, 1 Gbps can be connected.

Video signals and/or audio signals inputted from the network interface 1 are sent to the buffer memory 2 of the succeeding stage, at which they are temporarily buffered. The signals thus obtained are further sent to the VTR system unit 3.

Moreover, video signals and/or audio signals reproduced at the VTR system unit 3 at the time of reproduction in a manner described later are outputted to the buffer memory 2, at which they are temporarily buffered. The signals thus obtained are sent to external unit through the network interface 1 of the succeeding stage.

The network interface 1 sends, to the file system control unit 5, command, such as FTP command, etc. for the file system control unit 5 which is transmitted from external unit through the network.

The VTR system unit 3 serves to load a video cassette 10 provided with magnetic tape into video cassette loading unit (not shown) to execute recording onto the magnetic tape of video signals and/or audio signals sent from the above-described buffer memory 2, and reproduction of video signals and/or audio signals recorded on the magnetic tape.

The VTR system unit 3 comprises a magnetic tape drive unit for driving magnetic tape of the loaded video cassette 10, and a signal processing section for executing recording signal processing for performing conversion into a predetermined signal form optimum for recording video signals and/or audio signals inputted from the buffer memory 2 onto the magnetic tape, and reproduction signal processing for reproducing video signals and/or audio signals recorded on the magnetic tape to convert them into signals of a predetermined signal form.

Figure 2:
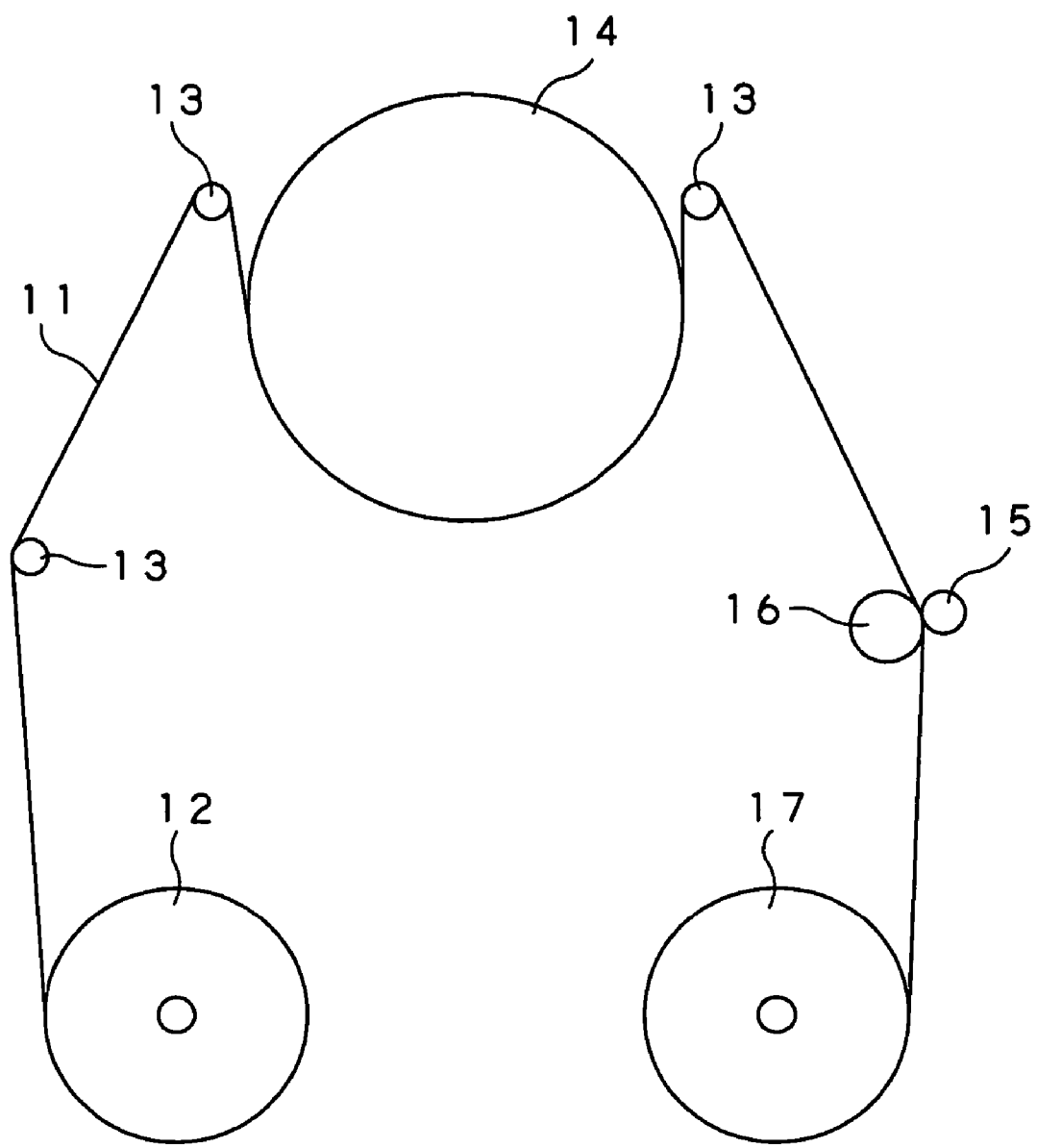
FIG. 2 is a view for explaining the essential part configuration of magnetic tape drive unit in the VTR.

When the video cassette 10 is loaded into loading unit (not shown), for example, the magnetic tape drive unit draws out the magnetic tape 11, as shown in FIG. 2, from the casing (hereinafter the casing of the video cassette 10 is referred to as cassette half) of the video cassette 10 by tape loading mechanism. The magnetic tape 11 which has been drawn out is wound at a predetermined winding angle and at a predetermined tension onto a rotation drum 14 including recording magnetic heads and reproduction magnetic heads which are not shown via tape guides 13 from a supply reel (hereinafter referred to as S reel) 12, and is passed through a path put between a capstan 15 for running the magnetic tape 11 at a predetermined speed and a pinch roller 16. Thus, the magnetic tape 11 arrives at a winding reel (hereinafter referred to as T reel) 17.

At the S reel 12, the capstan 15 and the T reel 17, there are respectively provided S reel motor, capstan motor and T reel motor (not shown) which are dedicated power units for rotationally driving them.

At the S reel motor, the capstan motor and the T reel motor, there are respectively provided FGs (Frequency Generators) which are nor shown. Thus, rotation information of respective motors are detected. The detected rotation information of the motors are used in calculating winding radius information which is one of file information.

The S reel 12, the rotation drum 14, the capstan 15 and the T reel 17 of the magnetic tape drive unit drive the magnetic tape 11 as the result of the fact that motors (not shown) which respectively drive them are controlled by the CPU 8.

The signal processing section implements, e.g., compression-encoding based on MPEG (Moving Picture Expert Group) to a video signal inputted from the buffer memory 2, at the time of recording, to implement error correction encoding by the Reed-Solomon product code to the compression-encoded video signal and audio signal inputted from the buffer memory 2, to add error correction code to further add synchronization data and ID data thereafter to form channel-coded serial data to record this data at a predetermined track on the magnetic tape 11 by recording magnetic heads, record video signal at VIDEO track and audio signal at AUDIO track. The signal processing section performs compression-encoding by MPEG to record compression-encoded video signal onto the magnetic tape 11 every 1 GOP.

A control signal used for tape drive servo control is recorded at a control track provided in the longitudinal direction on the magnetic tape 11, and Time Code (TC) which is position information of video signal recorded on the magnetic tape 11 is recorded at Time Code (TC) track.

Moreover, at the time of reproduction, the signal processing section implements processing opposite to that at the time of recording to video signal and/or audio signal which have been read out by the reproduction magnetic heads to output error-corrected audio signal to the buffer memory 2, and to expansion-decode similarly error-corrected video signal to output it to the buffer memory 2.

At the VTR system unit 3, in accordance with command input from control panel 4 which will be described later, or in accordance with the control based on file system of the CPU 8 which has received command from file system control unit 5 which will be described later, the magnetic tape drive unit drives magnetic tape at a predetermined speed, and the signal processing section records video signal/audio signal onto the magnetic tape 11, or reproduces video signal/audio signal from the magnetic tape 11.

The control panel 4 is an operation unit which inputs command for controlling a predetermined operation of the VTR system unit 3 that user designates. Command inputted from the control panel 4 is sent to the VTR system unit 3. User inputs, e.g., recording command for instructing recording of video signal/audio signal from the control panel 4 onto the magnetic tape 11, reproduction command for instructing reproduction of video signal/audio signal recorded on the magnetic tape 11, fast-forward command for conducting fast-forward of the magnetic tape 11 and/or rewinding command for rewinding the magnetic tape 11, etc. It is possible to record a predetermined video signal or audio signal onto the magnetic tape 11 without undergoing management by file system which will be described later by command inputted from the control panel 4.

Subsequently, prior to explanation of respective functions of the file system control unit 5, the ENC/DEC 6, the file system memory 7 and the CPU 8 which take file management of the file system of the VTR, outline of the file management by the file system of the VTR shown as the embodiment of the present invention will be explained.

The file system is a system for filing video signal/audio signal recorded on the magnetic tape 11 to perform file management; on the basis of file information. The file information used for file management of the file system are stored and held at memory tags 25, which will be described later, attached to video cassette 10 with respect to each video cassette 10 where the files are recorded.

When video cassette 10 is loaded into the video cassette loading unit (not shown) of the VTR, file information stored and held at the memory tag 25 is transmitted from the memory tag 25 to the ENC/DEC 6 in a non-contact state, and the transmitted file information is stored into the file system memory 7. The file information which has been stored by this file system memory 7 is caused to undergo management by the CPU 8 in accordance with command of the file system control unit 5. Thus, e.g., preparation of new file and/or updating of file, etc. are executed. When file information of the file system memory 7 is changed, added (supplemented) or deleted, file information is transmitted in turn from the ENC/DEC 6 to the memory tag 25 in a manner opposite to the above. Thus, file information of the memory tag 25 is also updated as occasion demands.

The file system control unit 5 receives command for file control, e.g, FTP command relating to file transfer, etc., which is transmitted from the external unit through the network interface 1 to control the CPU 8 in accordance with the command to execute processing such as updating/deletion of the content of file system stored in the file system memory 7 and/or addition (supplement) of new file, etc.

Here, the memory tag 25 for storing and holding file information which is attached to the video cassette 10 will be explained.

The memory tag 25 includes therewithin an erasable IC memory 22 in which record holding operation is unnecessary such as EEPROM (Electrically Erasable Programmable Read-Only Memory), an encoder/decoder (hereinafter referred to as ENC/DEC) 23 for encoding a signal received at coil antenna 24 which will be described later to write the encoded signal into the IC memory 22 to read out information stored in the IC memory 22 and decoding the information into a predetermined signal to send it to the coil antenna 24 which will be described later, and a coil antenna 24 for electromagnetically conducting supply of power and transmission/reception of signals, etc. and serves to perform transmission/reception of file information to and from the ENC/DEC 6 of the VTR in a non-contact state. The memory tag 25 is included within a label 21 attached to the cassette half of the video cassette 10, wherein, e.g., title, etc. of the content recorded on the magnetic tape 11 is written onto the label 21 by hand-writing or print, etc.

File information is written into the IC memory 22 of the memory tag 25 attached to the cassette half of this video cassette 10 at the time of recording onto the magnetic tape 11 of video signal. Moreover, when the video cassette is loaded into video cassette loading unit (not shown), file information stored in the IC memory 22 is read out, and is developed in the file system memory 7 as file system.

Practical file information to be stored into the IC memory 22 of the memory tag 25 is shown below. The file information of each file stored on the magnetic tape 11 is file name information which is name (title) of the file, file start Time Code (TC) information which is relative position information on the magnetic tape 11 of the file, file start T side winding radius information which is absolute position information on the magnetic tape 11 of the file, file end Time Code (TC) information which is relative position information on the magnetic tape 11 of the file, file end T side winding radius information which is absolute position information on the magnetic tape 11 of the file, file size information indicating data size of the file, file access right information indicating executable operation divisions with respect to the file, e.g., possession, read, write and/or execution, etc., system information indicating image system of video signal which is the file, e.g., NTSC (National Television System Committee), or PAL (Phase Alternation by Line), etc, stream information indicating bit rate of image compressed by MPEG (Moving Picture Experts Group) system, file preparation date information indicating date where the file has been prepared, file preparation time information indicating time when the file has been prepared, file updating date information indicating date when the file has been updated, and file updating time information indicating time when the file has been updated, etc.

The encoder/decoder 6 includes coil antenna (not shown), and serves to conduct electromagnetic coupling between the coil antenna and the coil antenna 24 within the memory tag 25 of the non-contact type to thereby supply power to the memory tag 25, and to conduct transmission/reception of file information to and from the memory tag 25.

The ENC/DEC 6 encodes file information which has been transmitted from the coil antenna 24 of the memory tag 25 to send the encoded file information to the file system memory 7 of the succeeding stage. Moreover, the ENC/DEC 6 reads out corresponding file information in the case where the content of the file system is updated, or newly supplemented (added) by control of file system control unit 5 which will be described later to decode the file information into a predetermined signal to transmit file information from coil antenna (not shown) to the coil antenna 24 of the memory tag 25.

The file system memory 7 is, e.g., a writable/readable RAM (Random Access Memory), etc., and stores, as file system, the above-described file information which has been transmitted from the memory tag 25 to the ENC/DEC 6.

The CPU 8 controls respective units of the VTR in a generalized manner. Moreover, the CPU 8 reads, by command from the file system control unit 5, file information within the file system stored in the file system memory 7 to control the operation of the VTR system unit 3, or update, delete or newly add, etc. the content of the file system stored in the file system memory 7 on the basis of the file information which has been read.

Subsequently, explanation will be given in connection with the operation at the time of file transmission and the operation at the time of file reception of the VTR shown as the embodiment of the present invention.

Figure 3:
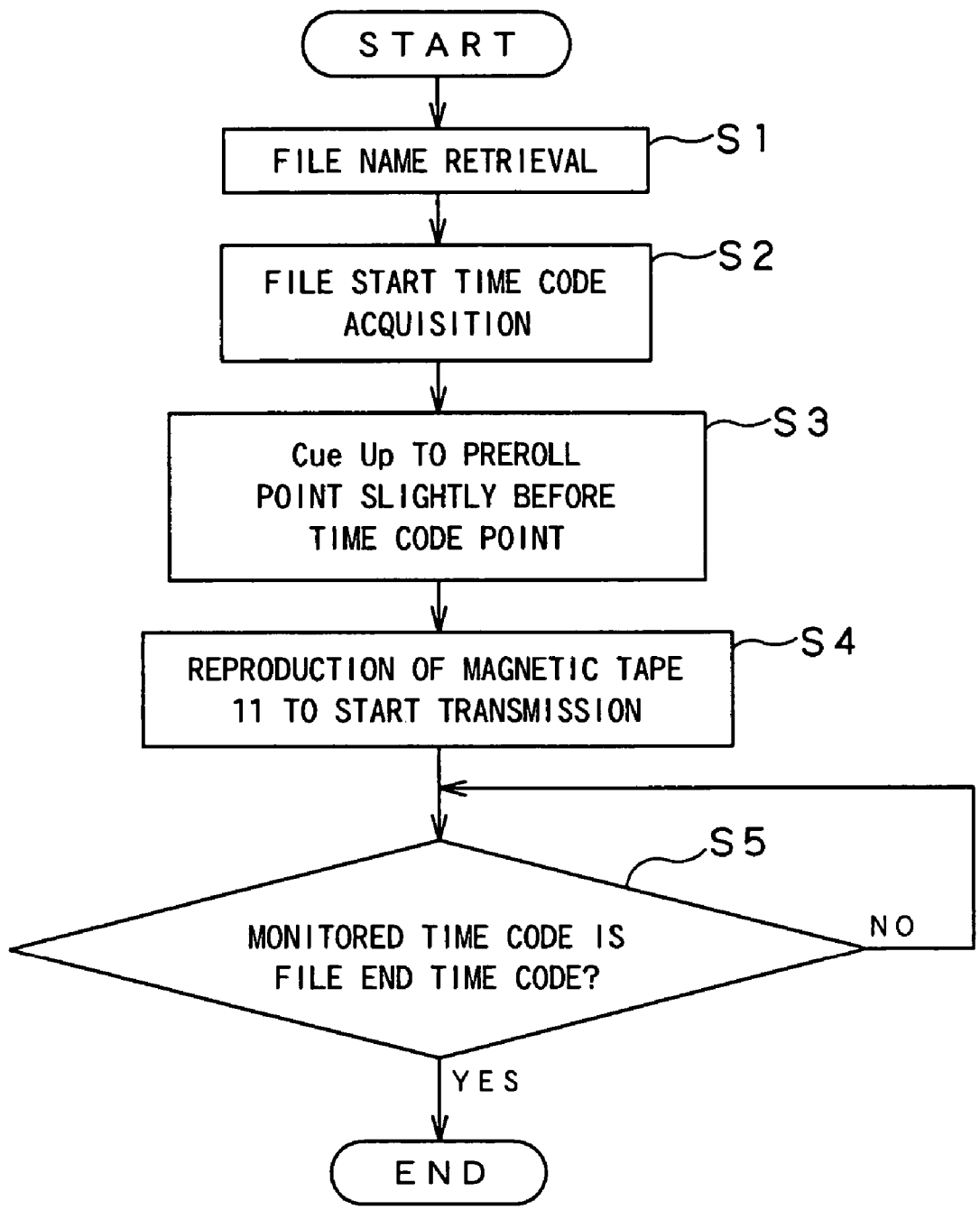
FIG. 3 is a flowchart for explaining file transmitting operation in the VTR.

First, the operation at the time of file transmission of the VTR will be explained by using the flowchart shown in FIG. 3.

At step S1, the CPU 8 retrieves, from the file system memory 7, file name information transmitted from external unit (not shown) to the file system control unit 5 through, e.g., the network interface 1.

At step S2, the CPU 8 retrieves the file system memory 7 to acquire file start Time Code (TC) of file corresponding to the file name information retrieved at the step S1.

At step S3, the CPU 8 controls the magnetic tape drive unit of the VTR system unit 3 to Cue Up to the preroll point slightly before the file start Time Code (TC) acquired at the step S2 which exists on the magnetic tape 11.

At step S4, the CPU 8 controls the VTR system unit 3 to conduct a control so as to reproduce the magnetic tape 11 to reproduce file data of the file to start transmitting operation. When the file data is being transmitted, Time Code (TC) is monitored at all times.

At step S5, the CPU 8 judges whether or not the Time Code (TC) being monitored is file end Time Code (TC). In the case where that Time Code (TC) is the file end Time Code (TC), the processing is completed. In the case where that Time Code (TC) is not the file end Time Code, the CPU 8 controls the VTR system unit 3 to reproduce the magnetic tape 11 to continuously execute transmission of file data of the file.

Figure 4:
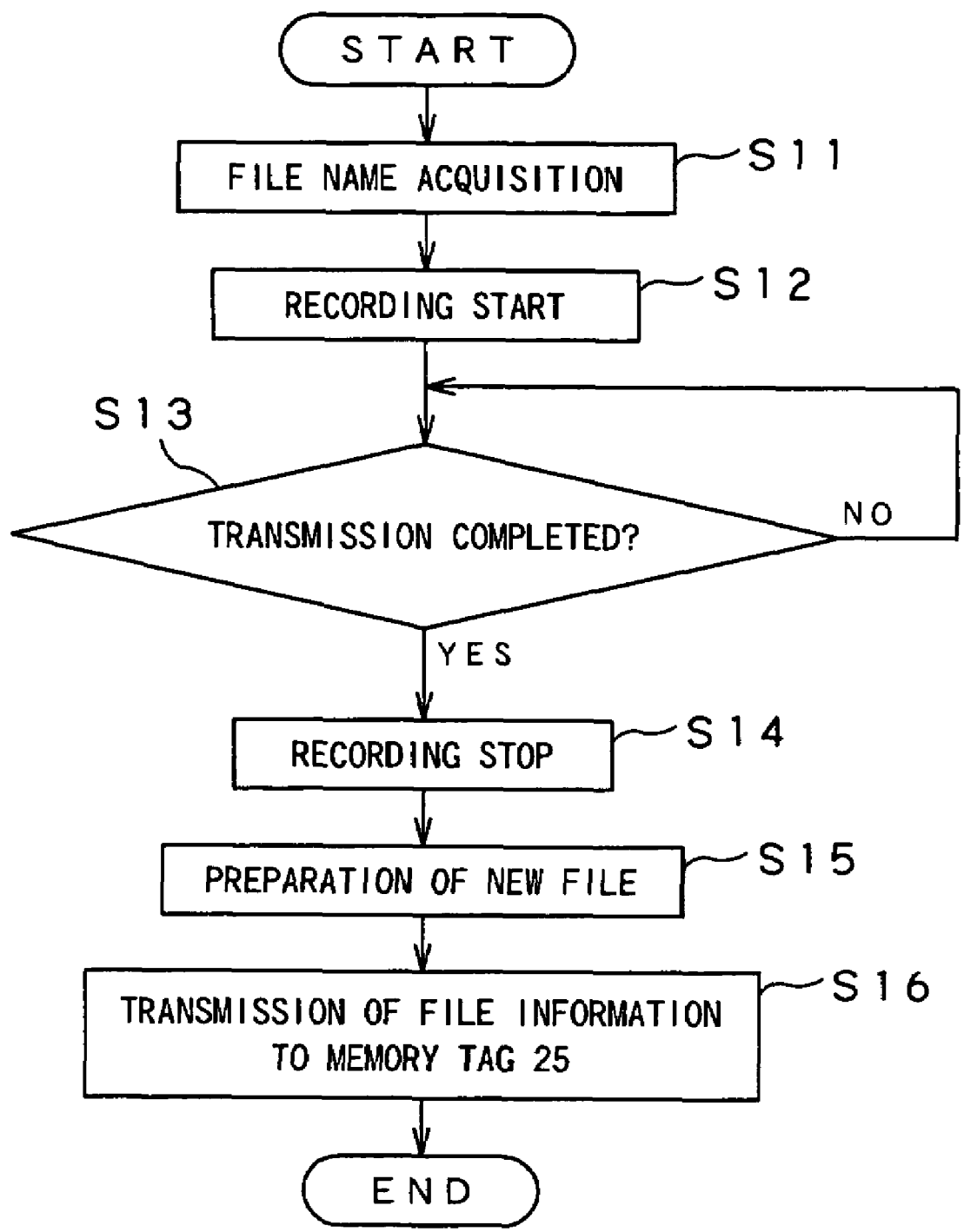
FIG. 4 is a flowchart for explaining file receiving operation in the VTR.

Then, explanation will be given by using the flowchart shown in FIG. 4 in connection with the operation at the time of reception of file of the VTR.

At step S11, the CPU 8 receives file name of file transmitted from the external unit through the network interface 1 and the file system control unit 5 to hold the received file name.

At step S12, the CPU 8 receives file data through the interface 1 to send instruction of recording (REC) or edit (ASSEMBLE, etc.) to the VTR system unit 3 in accordance with the fact that file data which has been stored in the buffer memory 2 becomes equal to a predetermined quantity to start recording onto the magnetic tape 11 of the received file data. The CPU 8 holds recording start Time Code (TC) simultaneously with recording start onto the magnetic tape 11 to always count Time Code (TC) during recording of file data onto the magnetic tape 11 to control the VTR system unit 3 so as to write Time Code (TC) at Time Code (TC) track of the magnetic tape 11.

At step S13, the CPU 8 judges whether or not transmitting operation of file data from external unit is completed. In the case where transmitting operation has been completed, the processing proceeds to step S14. In the case where transmitting operation is not completed, the CPU 8 continues recording operation of the VTR system unit 3 as it is.

At the step S14, the CPU 8 acquires end Time Code (TC) in accordance with the fact that transmitting operation of file data from external unit has been completed to control the VTR system unit 3 to stop recording operation.

At step S15, the CPU 8 prepares a new file from file name information, start Time Code (TC), end Time Code (TC), recording size and other information which have been held to update file information of the file system memory 7.

At step S16, the CPU 8 controls the encoder/decoder 6 to decode the file information which has been updated at the step S15 to transmit the decoded file information to the coil antenna 24 of the memory tag 25 as a predetermined signal. In accordance with this transmitting operation, the encoder/decoder 23 of the memory tag 25 encodes the predetermined signal received at the coil antenna 24 to write the encoded signal into the IC memory 22 as file information.

In this way, the VTR of the present invention allows the memory tag 25 attached to the video cassette 10 to store file information of file to read file information into the file system memory 7 as a file system in accordance with the fact that the video cassette 10 has been loaded to perform file management based on the file system by the file system control unit 5, thereby making it possible to easily provide access to the file system also in the file processing, e.g., transmission of file and/or reception of file.

Figure 5:
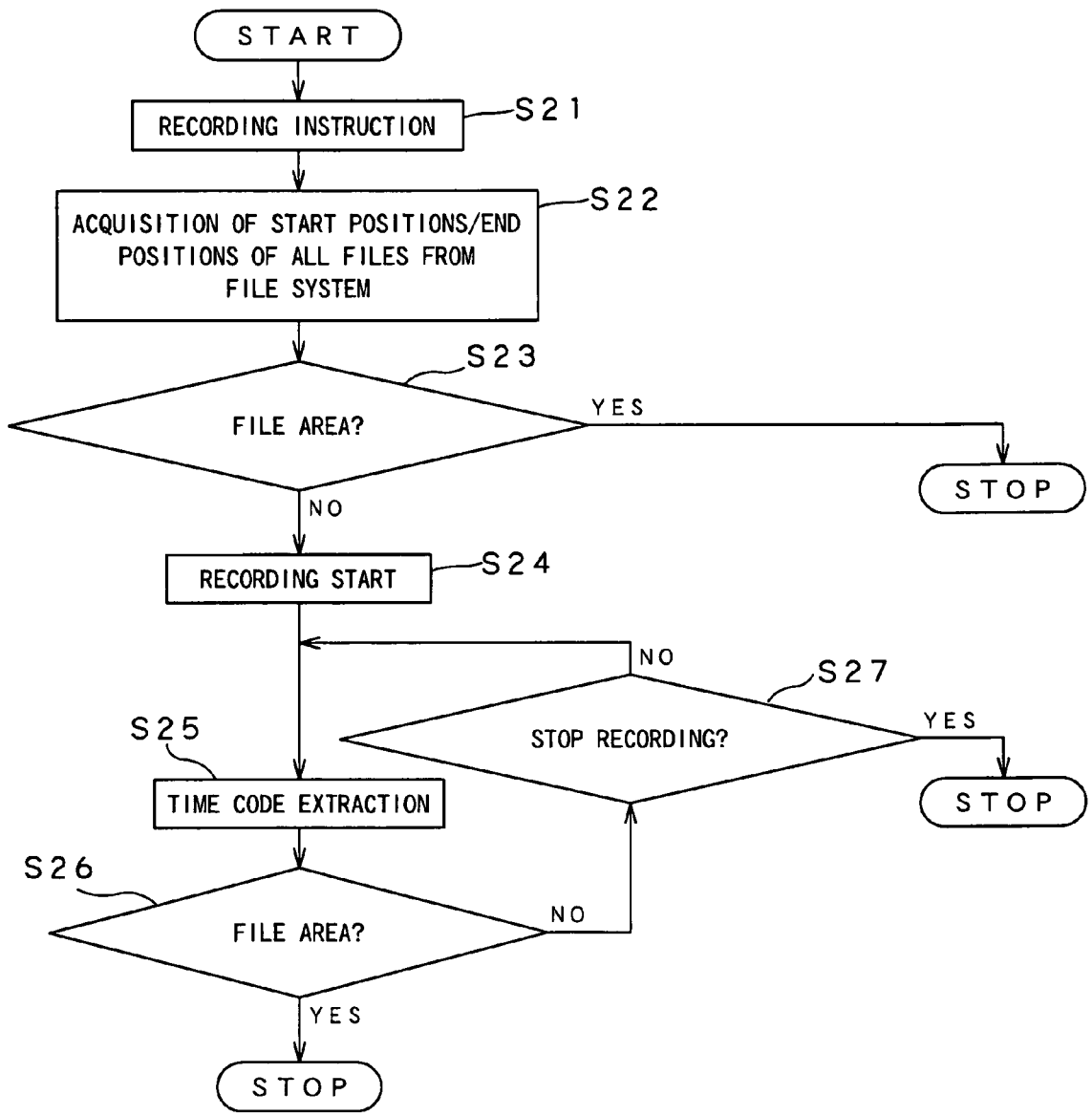
FIG. 5 is a flowchart for explaining, in the VTR, the operation in writing information onto magnetic tape without use of file system.

Then, explanation will be given by using the flowchart shown in FIG. 5 in connection with the operation in directly controlling the VTR system unit 3 without using the file system to record predetermined information onto the magnetic tape 11 in the VTR shown as the embodiment of the present invention.

First, at step S21, by user, recording (REC) command instructing recording of predetermined video signal/audio signal from the control panel 4 onto the magnetic tape 11 is inputted. The inputted recording (REC) command is sent to the CPU 8 through the VTR system unit 3.

At step S22, the CPU 8 acquires file start Time Code (TC) information and file end Time Code (TC) information of all files from the file system stored in the file system memory 7.

At step S23, the CPU 8 judges from the file start Time Code (TC) information and the file end Time Code (TC) information of all files which have been acquired at the step S22 whether or not the position on the magnetic tape 11 where recording (REC) command has been inputted is file area. In the case where that position is the file area, the CPU 8 stops recording operation of the VTR system unit 3. In the case where that position is not the file area, processing proceeds to step S24.

At the step S24, the CPU 8 controls the VTR system unit 3 to start recording of video signal and/or audio signal onto the magnetic tape 11.

At step S25, the CPU 8 extracts Time Code (TC) recorded at Time Code (TC) track of the magnetic tape for a time period during which recording is executed at the VTR system unit 3.

At step S26, the CPU 8 compares the Time Code (TC) extracted at the step S25 and the file start Time Code (TC) information and the file end Time Code (TC) information of all files which have been acquired at the step S22 to judge whether or not the position on the magnetic tape 11 being reproduced is the file area. In the case where that position is the file area, the CPU 8 stops recording operation of the VTR system unit 3. In the case where that position is not the file area, processing proceeds to step S27.

At the step S27, the CPU 8 judges whether or not STOP command which is command for stopping recording operation onto the magnetic tape 11 is inputted by user from the control panel 4 during recording operation onto the magnetic tape 11 by the VTR system unit 3. The CPU 8 conducts a control so that in the case where STOP command is inputted, recording operation of the VTR system unit 3 is stopped, and in the case where STOP command is not inputted, recording operation by the VTR system unit 3 is continued.

In a manner as stated above, the VTR shown as the embodiment of the present invention directly controls the VTR system unit 3 without intervention of the file system conventionally executed at the VTR although management of video signal and/or audio signal recorded onto the magnetic tape 11 is performed by the file system to have ability to execute recording operation implemented onto the magnetic tape 11.

Then, explanation will be given in connection with the operation in freely preparing file irrespective of the file system in the case where independent data such as image data, etc. are recorded on the magnetic tape 11 that the video cassette 10 has in the VTR shown as the embodiment of the present invention.

Figure 6:
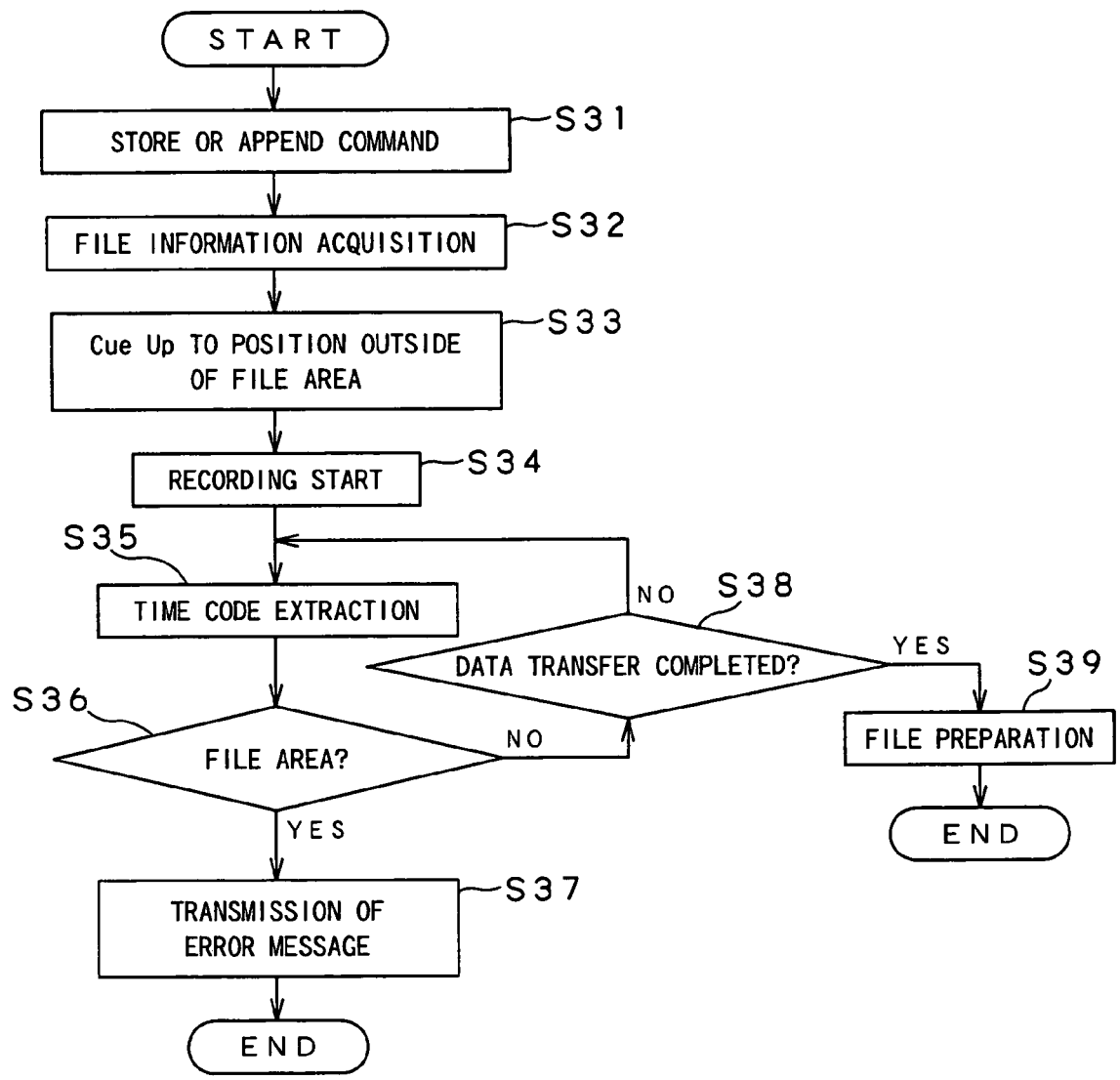
FIG. 6 is a flowchart for explaining, in the VTR, the operation to record information onto recording medium to prepare file by using file system.

First, explanation will be given by using the flowchart shown in FIG. 6 in connection with an operation to record, on the basis of the file system, predetermined information onto the magnetic tape 11 that the video cassette 10 has to prepare file in the VTR shown as the embodiment of the present invention.

At step S31, the file system control unit 5 receives, through the network interface 1, STORE command which is a command for recording a predetermined file transferred from external unit onto the magnetic tape 11, or APPEND command which is a command for adding (supplementing) and writing a predetermined file into a space (empty) area of the magnetic tape 11.

Figure 7A:
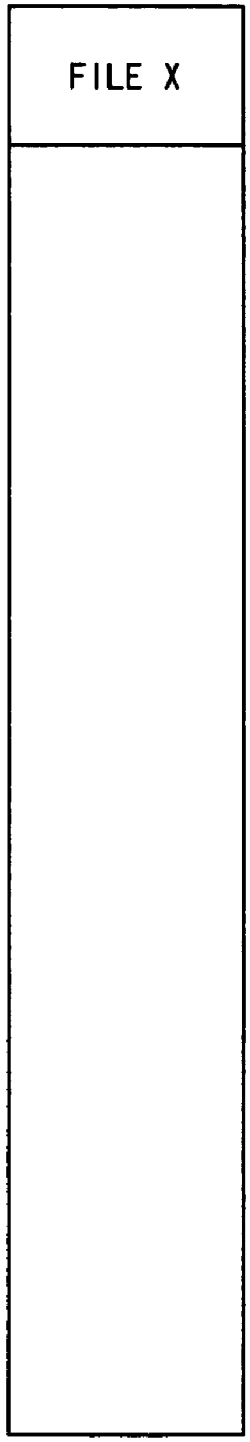
FIG. 7A is a view showing, in the VTR, the state where one file is recorded on magnetic tape.

At step S32, the file system control unit 5 controls the CPU 8 to acquire file information stored in the file system memory 7. For example, when file X is assumed to be recorded in advance on the magnetic tape 11 as shown in FIG. 7A, the CPU 8 acquires file information of the file X.

At step S33, the CPU 8 controls the VTR system unit 3 on the basis of the file information acquired at the step S32 to Cue Up to the position except for the file area of the magnetic tape 11. For example, the CPU 8 Cues Up in the area except for the file area of the file X shown in FIG. 7A.

At step S34, the CPU 8 controls the VTR system unit 3 to start recording of a predetermined data transferred from external unit through the network interface 1 from the position where Cue Up operation has been conducted.

At step S35, the CPU 8 extracts Time Code (TC) on the magnetic tape 11.

At step S36, the CPU 8 compares the Time Code extracted at the step S35 and file information acquired at the step S32 to judge whether or not the position on the magnetic tape 11 where data is recorded at present is file area. In the case where that position is the file area, processing proceeds to step S37. In the case where that position is not the file area, processing proceeds to step S38.

At the step S37, the CPU 8 stops recording of data because the current position on the magnetic tape 11 is the file area, and transmits, to the external unit, a message which notifies that transfer of data has become error.

In the case where transfer of data is completed so that recording onto the magnetic tape 11 has been completed at the step S38, processing by the CPU 8 proceeds to step S39. In the case where transfer of data is not completed, the CPU 8 continues transfer of data while extracting the Time Code (TC).

Figure 7B:
FIG. 7B is a view showing, in the VTR, the state where information is newly recorded on the magnetic tape shown in FIG. 7A to file it.

At the step S39, the CPU 8 controls the VTR system unit 3 to prepare file of data recorded on the magnetic tape 11. For example, when file Y is assumed to be prepared as shown in FIG. 7B, the file Y will be written into a data recording area except for the area of file X which has been recorded in advance on the magnetic tape 11.

File information of the prepared file is written into the file system memory 7 by the CPU 8 in accordance with control of the file system control unit 5.

Figure 8:
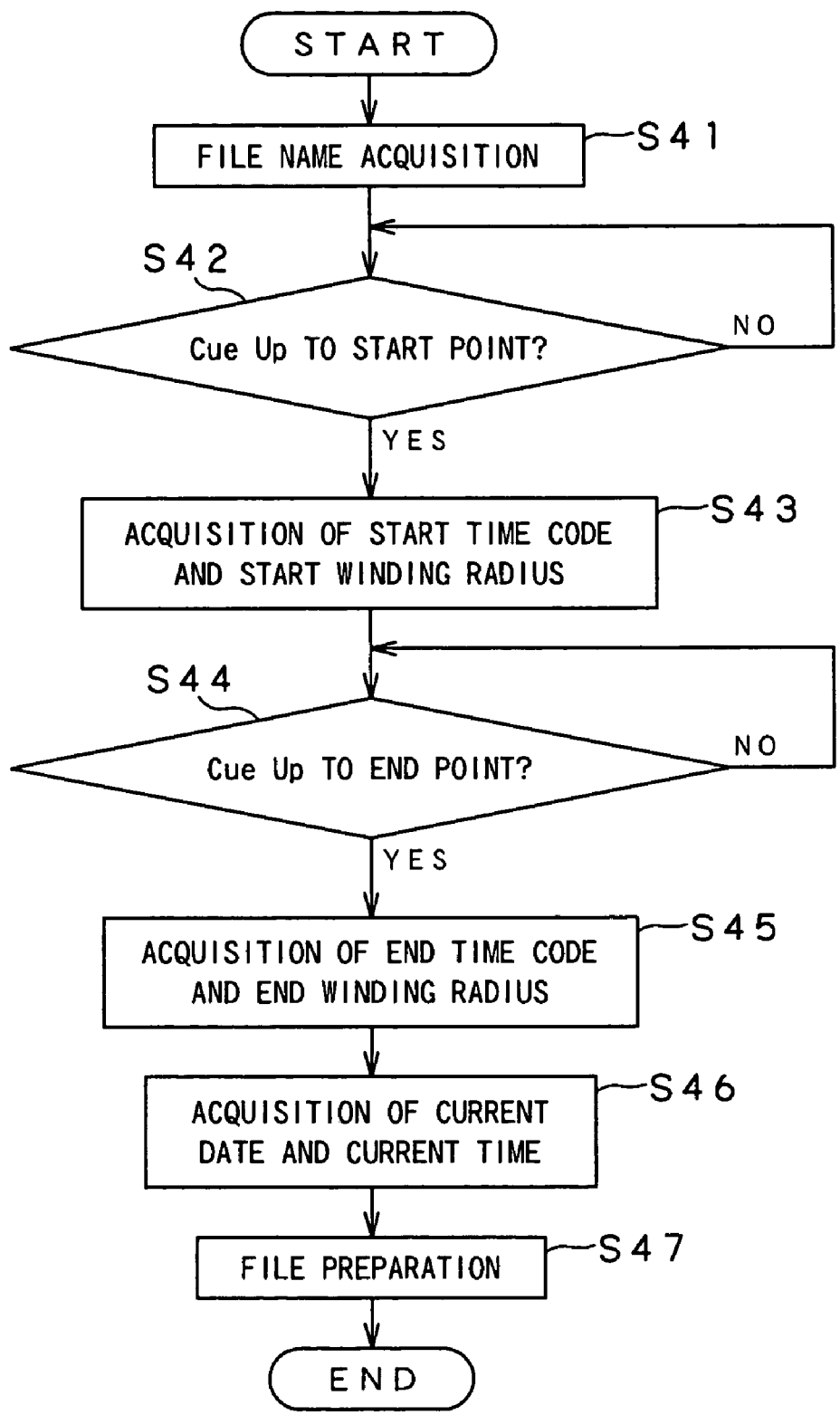
FIG. 8 is a flowchart for explaining, in the VTR, the operation to prepare file from information which has been recorded on recording medium without use of file system.

As stated above, the file system is used so that new file is prepared in an area except for the file area of the file X Subsequently, explanation will be given by using the flowchart shown in FIG. 8 in connection with the operation to freely file, irrespective of the file system, a predetermined information recorded in advance on the magnetic tape 11 that the video cassette 10 has to prepare file in the VTR shown as the embodiment of the present invention.

Figure 9A:
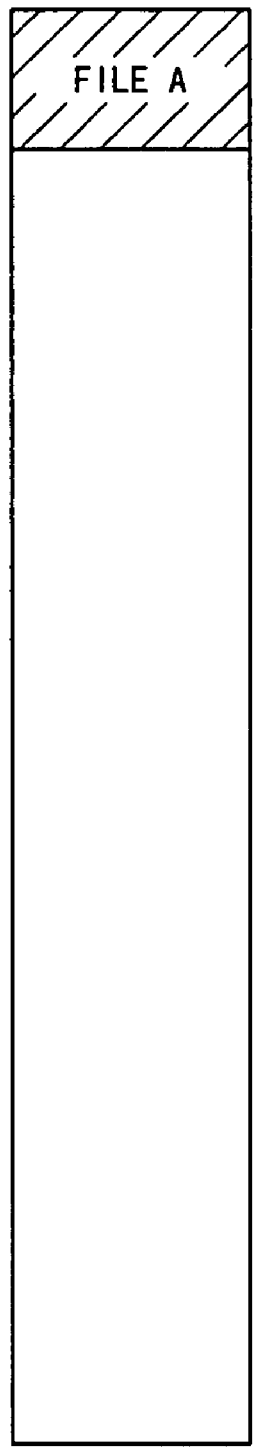
FIG. 9A is a view showing, in the VTR, the state where information which has already been recorded on magnetic tape is filed.

A video signal filed as file A as shown in FIG. 9A, for example, is assumed to be recorded in advance on the magnetic tape 11. In addition, a video signal is assumed to be recorded on the magnetic tape 11 without using the file system by instruction from the control panel 4.

First, at step S41, the file system control unit 5 receives file name information given to file to be prepared, which is transmitted from external unit (not shown) through network interface, to send the received file name information to the CPU 8. For example, the CPU 8 acquires file name information of file B.

Figure 9B:
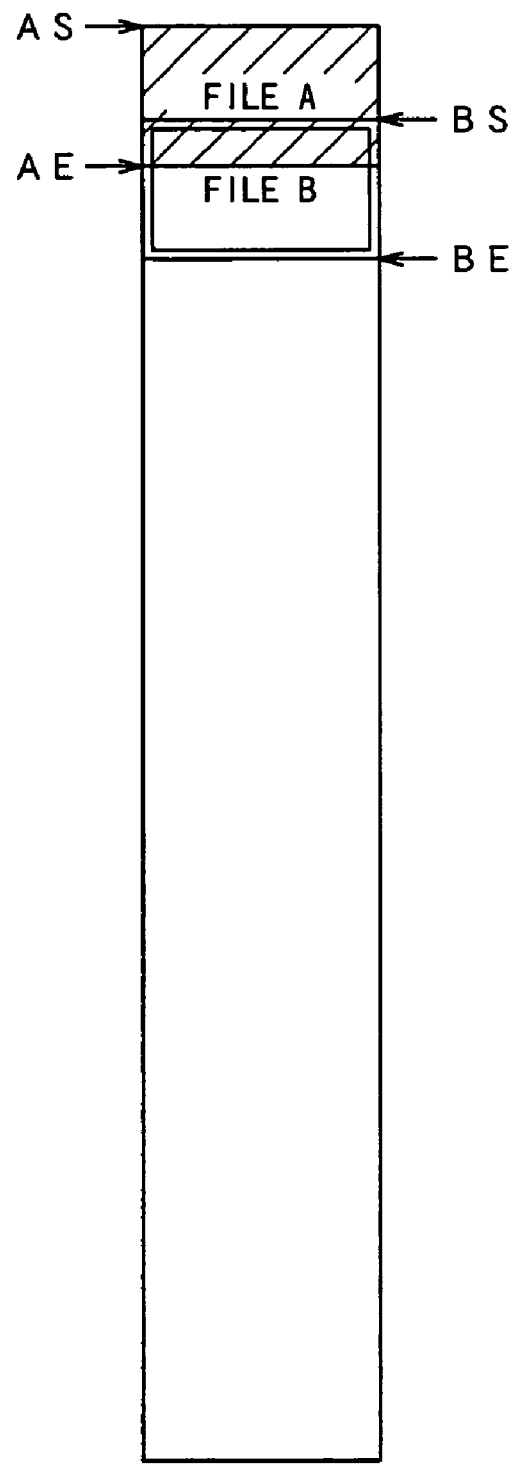
FIG. 9B is a view showing, in the VTR, the state where the information of file shown in FIG. 9A are caused to overlap to prepare new file.

At step S42, the CPU 8 controls the VTR system unit 3 to run the magnetic tape 11 to Cue Up to the position serving as file start point. For example, when file start point of the file B is assumed to be the position indicated as "BS" within file A as shown in FIG. 9B, Cue Up operation to the position of "BS" is conducted. When Cue Up operation has been conducted, processing proceeds to step S43.

At the step S43, the CPU 8 acquires Time Code (TC) of Cued Up file and winding radius information of the T reel 17 to allow them to be respectively file start Time Code (TC) information and file start T side winding radius information.

At step S44, the CPU 8 controls the VTR system unit 3 to run the magnetic tape 11 to Cue Up to the position caused to serve as file end point. For example, when the file end point of the file B is assumed to be the position indicated as "BE" as shown in FIG. 9B, Cue Up operation to the position of "BE" is conducted. When Cue Up operation is conducted, processing proceeds to step S45.

At the step S45, the CPU 8 acquires Time Code (TC) of the Cued Up file and winding radius information of the T reel 17 to allow them to be respectively file end Time Code (TC) information and file end T side winding radius information.

At step S46, the CPU 8 acquires current date and current time.

At step S47, the CPU 8 allows data recorded from the position of "BS" of the magnetic tape 11 to the position of "BE" thereof to be file B.

The file B prepared in this way is such that video signal recorded from the position of "BS" to the position of "AE" on the magnetic tape 11 is caused to overlap with the file A as shown in FIG. 9B. As a result, file is prepared irrespective of the file system.

Figure 10:
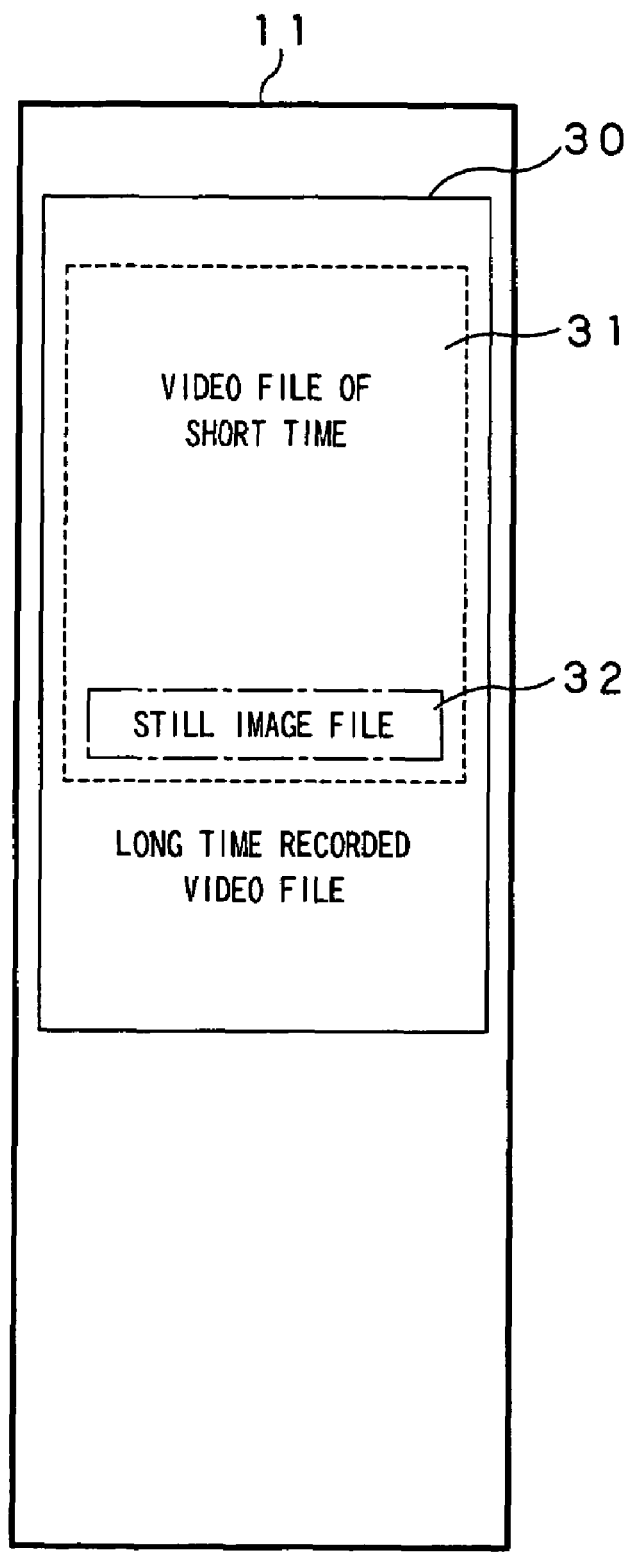
FIG. 10 is a view showing an example of a file to be prepared in the VTR.

Thus, as shown in FIG. 10, for example, long time recorded video file 30 can be properly used as short time video file 31 or still image file 32.

Subsequently, explanation will be given in connection with the operation in providing access to desired information (desired file) filed and recorded by the file system onto the magnetic tape 11 that the video cassette 10 has in the VTR shown as the embodiment of the present invention.

In the conventional VTR, access to desired information was executed by using Time Code (TC) recorded along with a predetermined information on the magnetic tape 11 and visual sense or auditory sense of user.

In the VTR shown as the embodiment of the present invention, access to a desired information (desired file) filed by the file system is provided by using winding radius information of S reel 12 and T reel 17 of the magnetic tape 11 in addition to conventionally used Time Code (TC).

In view of the above, how to determine winding radius information of the S reel 12 and the T reel 17 which are necessary at the time of file access operation at VTR shown as the embodiment of the present invention will be first explained.

The winding radius information is one of file information to be stored into the file system memory 7 as the file system similarly to the Time Code (TC) information, and while the Time Code (TC) information is information indicating relative position of file recorded on the magnetic tape 11, the winding radius information is information indicating absolute position of file recorded on the magnetic tape 11. The winding radius information is generated by the CPU 8 at the time of preparation of file, and is stored into the file system memory 7 as file information.

In order to run the magnetic tape 11 at low speed, e.g., to perform reproduction operation, it is necessary to stably run the magnetic tape 11 at a predetermined speed. For this reason, the magnetic tape 11 is caused to be in pressure contact with the capstan 15 which runs the magnetic tape 11 by the pinch roller 16 to run the magnetic tape 11 in such a manner that the capstan 15, the S reel 12 and the T reel 17 are caused to be interlocked with each other. On the contrary, in the case where the magnetic tape 11 is run at a high speed, the pinch roller 16 is away from the capstan 15 thereafter to run the magnetic tape 11 as the result of the fact that the S reel 12 and the T reel 17 are interlocked with each other. When the magnetic tape 11 is run in this way, radii of the S reel 12 and the T reel 17 (hereinafter referred to as winding radius) will change momentarily.

Meanwhile, since there is no possibility that the magnetic tape 11 may be wound onto the capstan 15, movement quantity of the magnetic tape can be easily determined from the number of rotations and the shaft diameter of the capstan 15.

Accordingly, in the state where the pinch roller 16 is caused to be in pressure contact with the capstan 15 (hereinafter referred to as ON mode as occasion may demand), i.e., when the magnetic tape 11 is run at low speed, movement quantity of the tape is determined from the number of rotations of the capstan 15 and the shaft diameter of the capstan 15 to divide the movement quantity thus determined by the products of respective numbers of rotations of the S reel 12 and the T reel 17 and $2\pi$, thereby making it possible to determine winding radii of the S reel and the T reel.

Moreover, in the state where the pinch roller 16 is away from the capstan 15 (hereinafter referred to as OFF mode as occasion may demand), i.e., when the magnetic tape 11 is run at a high speed, it is possible to determine winding radii of the S reel 12 and the T reel 17 by a method indicated below.

When the winding radius of the S reel 12 is assumed to be Rso and the winding radius of the T reel 17 is assumed to be Rto, Total Volume Tv of the magnetic tape 11 is winding radius of circle having area obtained by adding area of circle where the winding radius is Rso and area of circle where the winding radius is Rto. Accordingly, the relationship as indicated by the equation (1) is obtained.

$$\pi \cdot Tv^2 = \pi \cdot Rso^2 + \pi \cdot Rto^2 \quad (1)$$

Moreover, the equation (1)' is obtained from the equation (1).

$$Tv^2 = Rso^2 + Rto^2 \quad (1)'$$

By taking into consideration the fact that projection area of the magnetic tape 11 is invariable, the equation (1) holds also in connection with the winding radius Rs of the S reel 12 and the winding radius Rt of the T reel 17 at an arbitrary time. When winding radius Rs and winding radius Rt are substituted into the equation (1)', the equation (1)" is obtained.

$$Tv^2 = Rs^2 + Rt^2 \quad (1)''$$

Here, when ratio between the winding radius Rs of the S reel 12 and the winding radius Rt of the T reel 17 is expressed as Ratio=Rt/Rs, the equation (2) and the equation (3) are obtained.

$$Rs = \frac{Tv}{\sqrt{1 + Ratio^2}} \quad (2)$$

$$Rt = Rs \cdot Ratio \quad (3)$$

From the above fact, the winding radius Rs of the S reel 12 and the winding radius Rt of the T reel can be determined by the Total Volume Tv of the magnetic tape 11 and the Ratio.

FIG. 11 is a view in which constants and variables which are necessary in calculating the winding radii Rs, Rt are indicated.

The Total Volume Tv of the magnetic tape 11 and the Ratio can be determined by executing the following steps of (A) to (C).

(A) First, when the video cassette 10 is loaded into the loading unit (not shown) of the VTR, the CPU 8 controls the VTR system unit 3 to run the magnetic tape 11 by the capstan 15 to determine the Total Volume Tvo serving as reference by the following equations at the time point when the number of counts SRCFG of FG (Frequency Generator) provided at the capstan motor is expressed as |SRCFG|>SRCFG1.

$$Rso = \frac{Rc \times |SRCFG|}{|SRSFG|}$$

$$Rto = \frac{Rc \times |SRCFG|}{|SRTFG|}$$

$$Tvo = \sqrt{Rso^2 + Rto^2}$$

(B) Further, the CPU 8 controls the VTR system unit 3 to run the magnetic tape 11 by the capstan 15 to determine the Total Volume SRtmp by the following equations at the time point when SRCFG becomes |SRCFG|>SRCFG2.

$$Rso = \frac{Rc \times |SRCFG|}{|SRSFG|} \quad (4)$$

$$Rto = \frac{Rc \times |SRCFG|}{|SRTFG|}$$

$$SRtmp = \sqrt{Rso^2 + Rto^2}$$

$$Tvo \times \frac{(1000 - Swind1)}{1000} < SRtmp < Tvo \times \frac{(1000 + Swind1)}{1000}$$

In the case where the calculated Total Volume SRtmp satisfies the range indicated by the equation (4), processing proceeds to the subsequent step. In the case where the calculated Total Volume SRtmp does not satisfy that range, measured values of SRCFG, SRSFG and SRTFG which have been counted by respective FGs of the capstan 15, the S reel 12 and the T reel 17 are reset to repeat the step of (A) for a second time.

(C) Since the calculated SRtmp has satisfied the equation (4), Tvo is caused to be equal to SRtmp to further run the magnetic tape 11 by the capstan 15 to determine Total Volume SRtmp by the following equations at the time point when SRCFG becomes |SRCFG|>SRCGF3.

$$Rso = \frac{Rc \times |SRCFG|}{|SRSFG|} \quad (5)$$

$$Rto = \frac{Rc \times |SRCFG|}{|SRTFG|}$$

$$SRtmp = \sqrt{Rso^2 + Rto^2}$$

$$Tvo \times \frac{(1000 - Swind2)}{1000} < SRtmp < Tvo \times \frac{(1000 + Swind2)}{1000}$$

In the case where the calculated Total Volume SRtmp does not satisfy the range indicated by the equation (5), measured values of SRCFG, SRSFG, SRTFG which have been counted at respective FGs of the capstan 15, the S reel 12 and the T reel 17 are reset to repeat the step of (A) for a second time. In the case where the calculated Total Volume satisfies the equation (5), the Total Volume Tv and Ratio are determined as follows.

$Tv = SRtmp$ $$Ratio = \frac{1000 \times |SRTFG|}{|SRSFG|}$$

In a manner as stated above, when the video cassette 10 is loaded into loading unit (not shown) of the VTR, Total Volume Tv and Ratio which are necessary for calculating the winding radius Rs of the S reel 12 and the winding radius Rt of the T reel 17 are determined, and are held at the CPU 8.

<Calculation of the Winding Radii Rs, Rt in the OFF Mode>

The CPU 8 resets measured values of SRSFG and SRTFG which have been counted at respective FGs of the S reel 12 and the T reel 17 to run the magnetic tape 11 by the capstan 15 to determine Ratio tmp by the following equations at the time point when Rwind<|SRSFG| and Rwind<|SRTFG| hold.

$$tmp = \frac{1000 \times |SRTFG|}{|SRSFG|} \quad (6)$$

$$Ratio \times \frac{(1000 - Rwind)}{1000} < tmp < Ratio \times \frac{(1000 + Rwind)}{1000}$$

In the case where the calculated tmp does not satisfy the equation (6), the Ratio is as indicated below.

$$Ratio = Ratio + \frac{Ratio \times Rwind}{1000} \text{ (when } tmp > Ratio\text{)}$$

$$Ratio = Ratio - \frac{Ratio \times Rwind}{1000} \text{ (when } tmp < Ratio\text{)}$$

Conversely, in the case where the calculated tmp satisfies the equation (6), Ratio becomes equal to tmp, and winding radius Rs of the S reel 12 and winding radius Rt of the T reel 17 are determined in a manner as indicated below.

$$tmp = \sqrt{1000^2 + Ratio}$$

$$tmp = \sqrt{1000^2 + Ratio}$$

$$Rs = \frac{Tv \times 1000}{tmp}$$

$$Rt = \frac{Rs \times Ratio}{1000}$$

In general, when the magnetic tape is wound in roll form, air layer takes place between the magnetic tape and the magnetic tape, or the tape end is apt to be twisted. For this reason, the larger the winding radius of the tape becomes, the more error will be included in the winding radius of the tape. Moreover, at the magnetic tape 11 of the video cassette 10, there are many cases where file is prepared mainly near the beginning of the tape. In this case, since the winding quantity of the magnetic tape 11 of the S reel 12 is large, there is high possibility that winding radius information of the S reel 12 may include error. Accordingly, at the VTR shown as the embodiment of the present invention, winding radius information of the T reel 17 side is assumed to be used as winding radius information.

Figure 12:
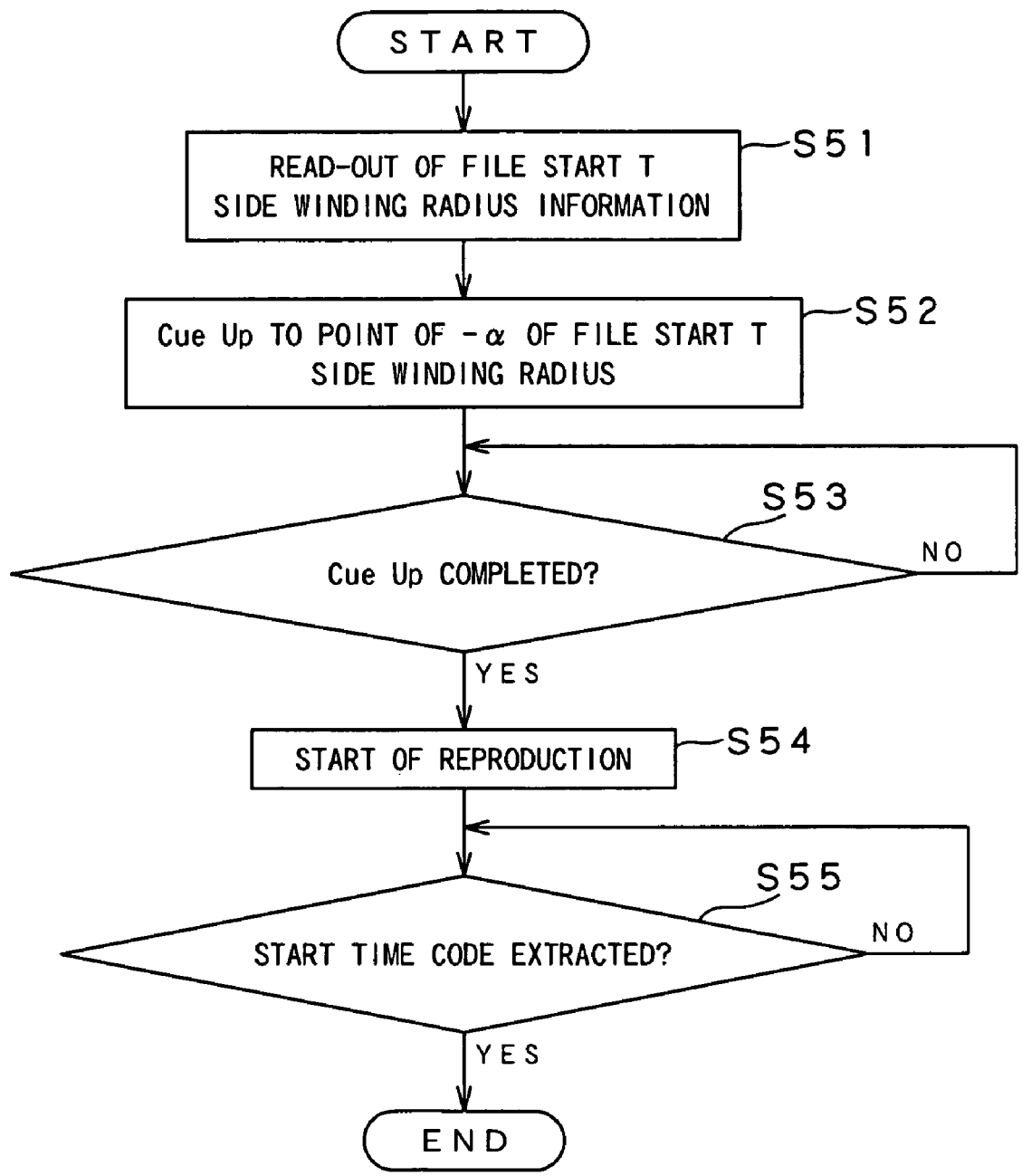
FIG. 12 is a flowchart for explaining, in the VTR, the operation when access to a predetermined file on magnetic tape is provided.

On the premise that the winding radius information is obtained in a manner as stated above, explanation will be given by using the flowchart shown in FIG. 12 in connection with access operation to file recorded on the magnetic tape 11 of the VTR shown as the embodiment of the present invention.

First, at step S51, user designates, e.g., from the control panel 4, file name of file that he desires to access and time code of a desired position of the file. The CPU 8 reads out, by the designated file name, file start T side winding radius information of designated file stored in the file system memory 7.

At step S52, the CPU 8 runs, on the basis of file start T side winding radius information which has been read out at the step S51, the magnetic tape 11 to the point of −α which is the portion in the vicinity of file start T side winding radius, e.g., −1 mm point to control the VTR system unit 3 so that Cue Up operation is conducted.

At step S53, the CPU 8 judges whether or not Cue Up operation has been completed. In the case where the Cue Up operation has been completed, processing proceeds to step S54. In the case where the Cue Up operation is not yet completed, the CPU 8 controls the VTR system unit 3 so that the Cue Up operation is continued as it is.

At step S54, the CPU 8 controls the VTR system unit 3 to reproduce the magnetic tape 11 to retrieve Time Code (TC) designated by user.

At step S55, the CPU 8 judges whether or not Time Code (TC) extracted as the result of the fact that the magnetic tape 11 is reproduced is a desired Time Code (TC) designated by user. In the case where that time Code (TC) is the desired Time Code (TC), processing is completed. In the case where that time code (TC) is not the desired Time Code (TC), the CPU 8 continues processing which retrieves the Time Code.

In a manner as stated above, the VTR serves to store, into the file system memory 7, file start T side winding radius information as one of file information to use Time Code (TC) information and file start T side winding radius information at the time of access to the file, thereby making it possible to securely execute access to a desired file on the magnetic tape 11.

It is to be noted that the above-described method of calculating the winding radius Rs of the S reel 12 and the winding radius Rt of the T reel 17 is one example, and various techniques can be applied without limiting to such calculation method.

INDUSTRIAL APPLICABILITY

As is clear from the above explanation, the information processing apparatus of the present invention is adapted to record image information and/or audio information onto replaceable tape-shaped recording medium by recording means to file, by filing means, the image information and/or the audio information which have been written onto the replaceable tape-shaped recording medium by the recording means to write and read, in a non-contact state, file information of file into random accessible memory means provided in a manner associated with the replaceable tape-shaped recording medium by file information writing/reading means, thereby making it possible to facilitate access to file system in performing management of image information and/or audio information which have been recorded on the tape-shaped recording medium in the state where those information are filed.

As is clear from the above explanation, the information processing apparatus of the present invention can perform management of file to be recorded onto the tape-shaped recording medium by the file system, and can also record predetermined image information and/or audio information onto the tape-shaped recording medium without using the file system in a manner free from paying attention to file recorded on the tape-shaped recording medium.

As is clear from the above explanation, at the information processing apparatus of the present invention, in the case where new file is prepared on tape-shaped recording medium where files have been already recorded, file preparation means files predetermined image information and/or audio information as a new file in accordance with file preparation instruction generated at instruction generating means irrespective of file area where files have been prepared, thereby making it possible to freely prepare file from predetermined image information and/or audio information which have been recorded on the tape-shaped recording medium.

Moreover, since the information processing apparatus of the present invention can prepare new file where image information and/or audio information of file which have been already recorded on the tape-shaped recording medium overlapping with each other, it becomes possible to effectively utilize recording capacity of the tape-shaped recording medium.

As is clear from the above explanation, the information processing apparatus of the present invention uses winding radius information of wound tape-shaped recording medium in addition to Time Code information conventionally used, thereby making it possible to securely provide access to image information and/or audio information within desired file recorded on the tape-shaped recording medium without depending upon visual sense or auditory sense of user.

Further, the information processing apparatus of the present invention first provides, by using winding radius information, access to file recording start point of file which has been recorded on the tape-shaped recording medium in providing access to image information and/or audio information within desired file. For this reason, as compared to the case where the tape-shaped recording medium is reproduced to provide access using only Time Code information, access time to image information and/or audio information within desired file can be greatly reduced.

As is clear from the above explanation, the information processing method of the present invention includes: recording image information and/or audio information onto replaceable tape-shaped recording medium; filing the image information and/or the audio information which have been written onto the replaceable tape-shaped recording medium; writing, in a non-contact state, file information of file into random accessible memory means provided in a manner associated with the replaceable tape-shaped recording medium; and reading, in a non-contact state, the file information which has been written into the memory means, thereby making it possible to facilitate access to file system in performing management of image information and/or audio information which have been recorded on the tape-shaped recording medium in the state where they are filed.

The invention claimed is:

1. An information processing apparatus comprising:
    recording means for recording image information and/or audio information onto a replaceable tape-shaped recording medium wound on a pair of reels;
    filing means for filing the image information and/or the audio information which have been written on the replaceable tape-shaped recording medium by the recording means;
    file information writing/reading means for writing and reading, in a non-contact state, file information of the file into random accessible memory provided in a manner associated with the replaceable tape-shaped recording medium; and
    winding radius calculating means for calculating winding radius of each reel with the replaceable tape-shaped recording medium when a file is recorded on the tape-shaped recording medium,
    wherein the radius calculating means calculates the winding radius based on a radius of a capstan, a first counter value of the capstan, and a second counter value of each of the reels,
    wherein the calculated winding radius is associated with the file as the file information, and
    wherein the winding radius calculating means further calculates a total volume of the pair of reels wound with the replaceable tape-shaped recording medium in order to calculate the winding radius.

2. The information processing apparatus as set forth in claim 1, further comprising:
    reproducing means for reproducing image information and/or audio information which have been recorded on the replaceable tape-shaped recording medium;
    file system memory means for storing, as file system, file information which has been read out by the file information writing/reading means; and
    management means for performing management of files which have been recorded on the tape-shaped recording medium in accordance with the file system.

3. The information processing apparatus as set forth in claim 1, further comprising:
    transmitting/receiving means for receiving image information and/or audio information transmitted from an external location, and for transmitting, to the external location, the image information and/or the audio information which have been reproduced by the reproducing means.

4. The information processing apparatus as set forth in claim 2, further comprising:
    control means for conducting a control to record image information and/or audio information onto the tape-shaped recording medium by the recording means in accordance with access through the file system, or access without intervention of the file system,
    wherein the control means controls, in recording image information and/or audio information onto the tape-shaped recording medium without intervention of the file system, the recording means to limit recording of the image information and/or the audio information on the basis of the file system.

5. The information processing apparatus as set forth in claim 4, further comprising:
    time code information acquisition means for acquiring time code information of all files,
    wherein the control means controls the recording means, on the basis of time code information which has been acquired by the time code information acquisition means, to limit recording onto the recording medium of the image information and/or the audio information.

6. The information processing apparatus as set forth in claim 5, further comprising:
    time code information extraction means for continuously extracting time code information for a time period during which the image information and/or the audio information are recorded by the recording means,
    wherein the control means compares time code information extracted by the time code information extraction means and time code information acquired by the time code information acquisition means to control the recording means to limit recording onto the recording medium of the image information and/or the audio information.

7. The information processing apparatus as set forth in claim 6,
wherein the control means controls the recording means to stop recording on the recording medium of the image information and/or the audio information when time code information extracted by the time code extraction means and time code information acquired by the time code information acquisition means overlap with each other.

8. The information processing apparatus as set forth in claim 4,
wherein the control means controls the recording means to record, as file, the image information and/or the audio information when there exists a recording area except for file area of the recording medium from time code information indicating position on the recording medium of file recorded onto the recording medium in accordance with access through the file system.

9. The information processing apparatus as set forth in claim 4,
wherein the control means controls the recording means to record the image information and/or the audio information when there exists an unrecorded area in a recording area on the recording medium from time code information which is position information on the recording medium.

10. The information processing apparatus as set forth in claim 1, further comprising:
instruction generating means for generating a file preparation instruction which instructs file preparation to the filing means which files the image information and/or the audio information which are recorded on the tape-shaped recording medium,
wherein the filing means files, as a new file, the image information and/or the audio information in accordance with the file preparation instruction generated by the instruction generating means, irrespective of a file area where the file is prepared, when the new file is prepared on the recording medium where the file has been already recorded.

11. The information processing apparatus as set forth in claim 10, wherein the filing means prepares the new file within a new file area by overwriting an area that has been previously written.

12. The information processing apparatus as set forth in claim 10,
wherein the file is an image file consisting of image information of GOP (Group of Picture) unit.

13. The information processing apparatus as set forth in claim 1, further comprising:
driving means for driving the tape-shaped recording medium;
memory means for storing time code information indicating position within the file of information recorded as the file on the tape-shaped recording medium and the winding radius information calculated by the winding radius information calculating means in such a manner associated with the file; and
access control means for controlling the driving means on the basis of the time code information and the winding radius information which have been read from the memory means to perform access control with respect to the information.

14. The information processing apparatus as set forth in claim 13, further comprising:
extraction means for extracting the time code information recorded on the tape-shaped recording medium,
wherein the access control means controls the driving means until the time code corresponding to the information to be accessed is extracted by the extraction means to perform driving operation.

15. An information processing method including:
recording image information and/or audio information onto a replaceable tape-shaped recording medium wound on a pair of reels;
filing the image information and/or the audio information which have been written onto the replaceable tape-shaped recording medium;
writing, in a non-contact state, file information of the file into random accessible memory provided in a manner associated with the replaceable tape-shaped recording medium;
reading, in a non-contact state, file information of the file and ratio information which has been written into the memory; and
calculating winding radius of each reel with the replaceable tape-shaped recording medium when a file is recorded on the tape-shaped recording medium,
wherein the radius calculating step calculates the winding radius based on a radius of a capstan, a first counter value of the capstan, and a second counter value of each of the reels,
wherein the calculated winding radius is associated with the file as the file information, and
wherein the winding radius calculating step further calculates a total volume of the pair of reels wound with the replaceable tape-shaped recording medium in order to calculate the winding radius.

* * * * *